United States Patent
Yamamoto

(10) Patent No.: US 10,446,011 B2
(45) Date of Patent: Oct. 15, 2019

(54) SYSTEM AND METHOD FOR PROVIDING REAR SEAT MONITORING WITHIN A VEHICLE

(71) Applicant: Honda Motor Co., Ltd., Tokyo (JP)

(72) Inventor: Stuart Masakazu Yamamoto, La Mirada, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/981,993

(22) Filed: May 17, 2018

(65) Prior Publication Data

US 2019/0057595 A1 Feb. 21, 2019

Related U.S. Application Data

(60) Provisional application No. 62/546,990, filed on Aug. 17, 2017.

(51) Int. Cl.
- *G08B 21/24* (2006.01)
- *G08B 21/22* (2006.01)
- *G06K 9/00* (2006.01)
- *B60N 2/00* (2006.01)

(52) U.S. Cl.
CPC ............ *G08B 21/24* (2013.01); *B60N 2/002* (2013.01); *G06K 9/00838* (2013.01); *G08B 21/22* (2013.01)

(58) Field of Classification Search
CPC combination set(s) only.
See application file for complete search history.

(56) References Cited

U.S. PATENT DOCUMENTS

| | | | |
|---|---|---|---|
| 9,305,463 B1 | 4/2016 | Yellambalase | |
| 9,446,770 B2 | 9/2016 | Valeri et al. | |
| 9,630,496 B2 | 4/2017 | Cuddihy et al. | |
| 9,965,940 B1* | 5/2018 | Voss | G08B 21/22 |
| 2006/0291697 A1 | 12/2006 | Lou | |
| 2011/0074565 A1* | 3/2011 | Cuddihy | B60N 2/002 340/457 |
| 2012/0154136 A1 | 6/2012 | Connelly, Jr. | |
| 2016/0004261 A1 | 11/2016 | Dorsey | |
| 2016/0379466 A1* | 12/2016 | Payant | G08B 21/24 340/457 |
| 2017/0043783 A1 | 2/2017 | Shaw | |
| 2017/0124848 A1 | 5/2017 | Zhou | |
| 2017/0240110 A1* | 8/2017 | Lopez-Hinojosa | H04W 76/10 |

* cited by examiner

*Primary Examiner* — Travis R Hunnings
(74) *Attorney, Agent, or Firm* — Rankin, Hill & Clark LLP

(57) ABSTRACT

A system and method for providing rear seat monitoring within a vehicle that include activating a vehicle camera system to capture images of at least one rear seat of the vehicle. The system and method also include determining if at least one rear seat passenger is located within the at least one rear seat of the vehicle. The system and method additionally include determining that an ignition of the vehicle is disabled. The system and method further include providing at least one type of alert upon determining that the ignition of the vehicle is disabled.

20 Claims, 7 Drawing Sheets

SYSTEM AND METHOD FOR PROVIDING REAR SEAT MONITORING WITHIN A VEHICLE

This application claims priority to U.S. Provisional Application Ser. No. 62/546,990 filed on Aug. 17, 2017, which is expressly incorporated herein by reference.

BACKGROUND

In many instances a driver may transport children or pets as rear seat passengers within a vehicle. In some cases, upon the driver exiting the vehicle, one or more rear seat passengers may not be able to communicate their presence to the driver. For example, the one or more rear seat passengers may be in a state of sleep, may be an infant within a rear-facing car seat, or a pet that is laying across one or more vehicle seats. In such cases there may be a potential that the driver of the vehicle may accidentally forget about the presence of the rear seat passengers upon exiting the vehicle.

BRIEF DESCRIPTION

According to one aspect, a computer-implemented method for providing rear seat monitoring within a vehicle that includes activating a vehicle camera system to capture images of at least one rear seat of the vehicle. The computer-implemented method also includes determining if at least one rear seat passenger is located within the at least one rear seat of the vehicle. Image data associated with the images of the at least one rear seat of the vehicle is analyzed to determine if the at least one rear seat passenger is located within the at least one rear seat. The computer-implemented method additionally includes determining that an ignition of the vehicle is disabled. The computer-implemented method further includes providing at least one type of alert upon determining that the ignition of the vehicle is disabled. The at least one type of alert is based on if the at least one rear seat passenger is determined to be located within the at least one rear seat of the vehicle.

According to another aspect, a system providing rear seat monitoring within a vehicle that includes a memory storing instructions when executed by a processor that cause the processor to activate a vehicle camera system to capture images of the at least one rear seat of the vehicle. The instructions also cause the processor to determine if at least one rear seat passenger is located within the at least one rear seat of the vehicle. Image data associated with the images of the at least one rear seat of the vehicle is analyzed to determine if the at least one rear seat passenger is located within the at least one rear seat. The instructions additionally cause the processor to determine that an ignition of the vehicle is disabled. The instructions further cause the processor to provide at least one type of alert upon determining that the ignition of the vehicle is disabled. The at least one type of alert is based on if the at least one rear seat passenger is determined to be located within the at least one rear seat of the vehicle.

According to still another aspect, a computer readable storage medium storing instructions that when executed by a computer, which includes at least a processor, causes the computer to perform a method that includes activating a vehicle camera system to capture images of at least one rear seat of the vehicle. The instructions also include determining if at least one rear seat passenger is located within the at least one rear seat of the vehicle. Image data associated with the images of the at least one rear seat of the vehicle is analyzed to determine if the at least one rear seat passenger is located within the at least one rear seat. The instructions additionally include determining that an ignition of the vehicle is disabled. The instructions further include providing at least one type of alert upon determining that the ignition of the vehicle is disabled. The at least one type of alert is based on if the at least one rear seat passenger is determined to be located within the at least one rear seat of the vehicle.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
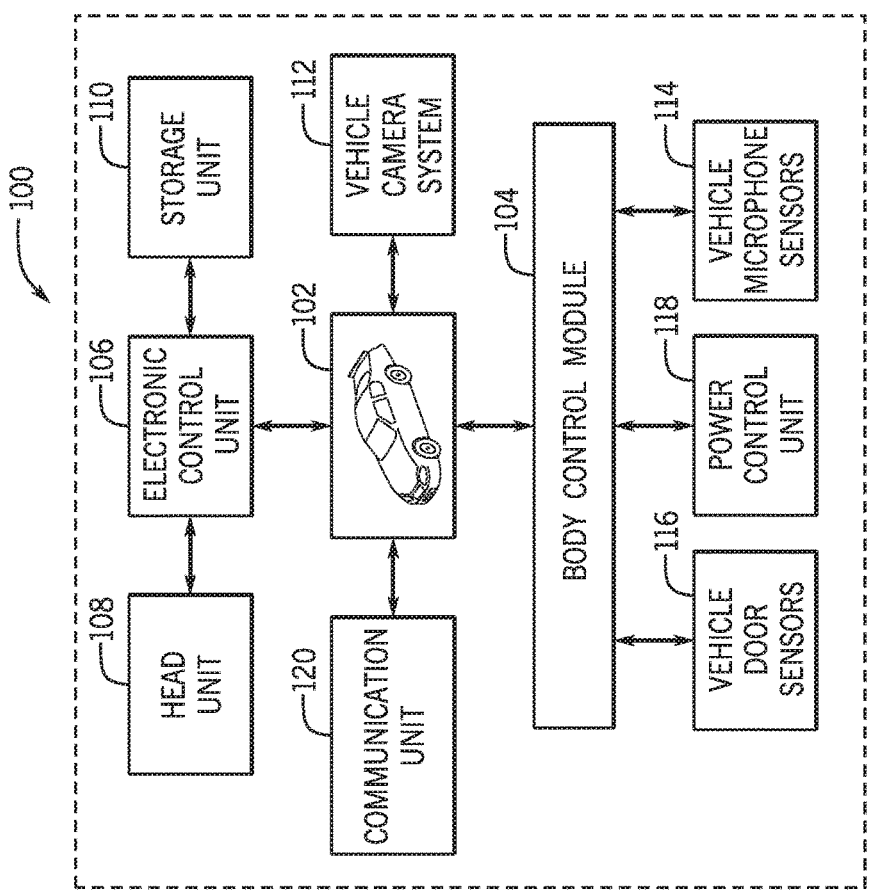
FIG. 1 is a schematic view of an operating environment of a rear seat monitoring system (RSM system) for providing rear seat monitoring of a vehicle according to an exemplary embodiment of the present disclosure.
Figure 1:
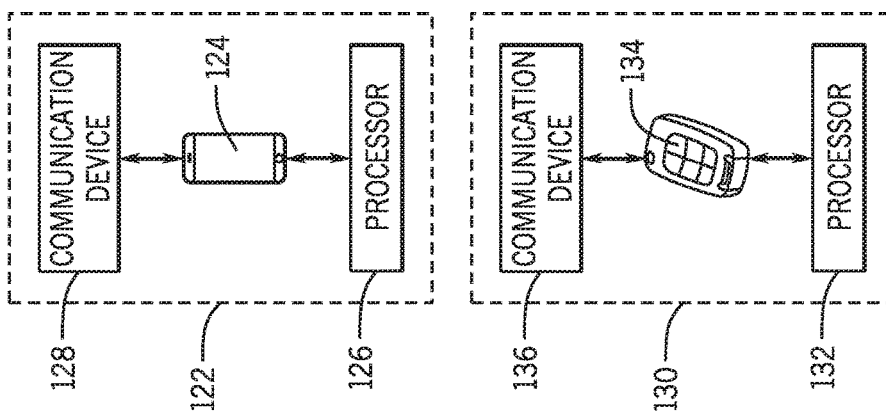

The following includes definitions of selected terms employed herein. The definitions include various examples and/or forms of components that fall within the scope of a term and that can be used for implementation. The examples are not intended to be limiting.

A "bus", as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database", as used herein can refer to table, a set of tables, and a set of data stores and/or methods for accessing and/or manipulating those data stores. Some databases can be incorporated with a disk as defined above.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications can be sent and/or received. An operable connection can include a wireless interface, a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (EV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x."

I. System Overview

The systems and methods described herein may be utilized to provide a rear seat monitoring system 100 (RSM system) in a vehicle 102 to remind a driver of a vehicle 102 of an existence of one or more passengers (i.e., non-driver occupants) and/or objects (e.g., packages) that may be located within one or more rear seats of the vehicle 102.

Figure 2:
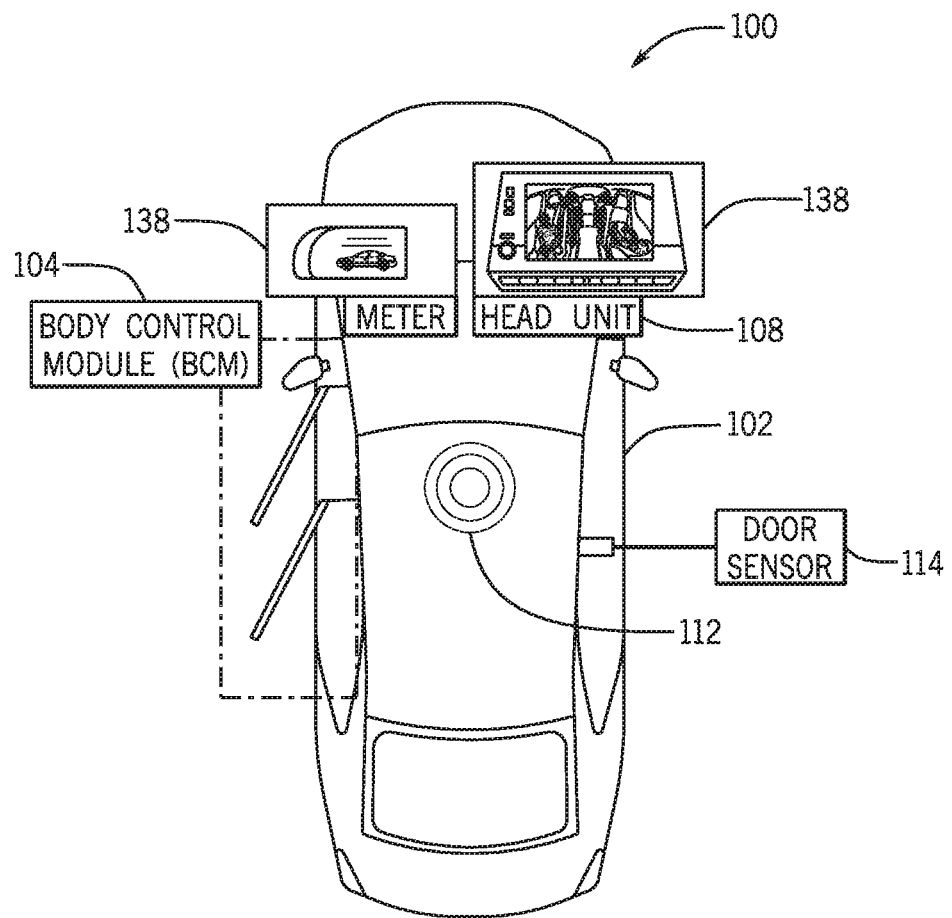
FIG. 2 is an illustrative view of an environment of the RSM system within the vehicle according to an exemplary embodiment of the present disclosure.

Referring now to the drawings, wherein the showings are for purposes of illustrating one or more exemplary embodiments and not for purposes of limiting the same, with reference to FIG. 1 and FIG. 2, the RSM system 100 may be utilized to provide a respective alert to a driver of the vehicle 102 upon determining the existence or non-existence of one or more rear seat passengers/objects within the vehicle 102. The components of the environment, as well as the components of other systems, hardware architectures, and software architectures discussed herein, may be combined, omitted, or organized into different architectures for various embodiments.

Generally, the vehicle 102 includes a body control module 104 (BCM) that may be operably connected to an electronic control unit (ECU) 106 that executes instructions provided by the BCM 104. The BCM 104 and the ECU 106 may each individually include a processor (not shown), a memory (not shown), a disk (not shown), and an input/output (I/O) interface (not shown), which are each operably connected for computer communication via a bus (not shown). The respective I/O interface provides software and hardware to facilitate data input and output between the components of the BCM 104 and the ECU 106 and other components, networks, and data sources, of the environment 100.

In an exemplary embodiment, the BCM 104 may receive inputs and may be utilized to determine the presence of the one or more rear seat passengers (e.g., children, pets) and/or objects within the vehicle 102 and to accordingly provide the respective alert to the driver of the vehicle 102 based on instructions that are provided to one or more components of the vehicle 102 through the ECU 106.

As discussed in more detail below, the RSM system 100 may be activated and deactivated based on an ignition status of the vehicle 102 and/or a status of one or more doors of the vehicle 102. In particular, the RSM system 100 may receive data that pertains to an enablement or disablement of an ignition of the vehicle 102. Additionally, the RSM system 100 may receive data that pertains to the opening and closing of one or more rear doors of the vehicle 102. The RSM system may responsively be activated based on the ignition status and/or the door status to receive data from one or more components of the RSM system 100 (components discussed in more detail below) to determine the presence of one or more rear seat passengers within the vehicle 102.

As discussed below, the RSM system 100 may provide the driver of the vehicle 102 with one or more types of alerts based on the determination that one or more rear seat passengers/objects are determined to be located within the one or more of the rear seats of the vehicle 102 and/or one or more rear seat passengers/objects are not determined to be located within the one or more rear seats of the vehicle 102 to remind the driver of the vehicle 102 to check the rear seats of the vehicle 102 prior to and/or upon departing the vehicle 102.

In an exemplary embodiment, in addition to the BCM 104 and the ECU 106, the components of the vehicle 102 of the RSM system 100 may include, but may not be limited to, a head unit 108, a storage unit 110, a vehicle camera system 112, vehicle microphone sensors 114, vehicle door sensors 116, a power control unit 118, and a communication unit 120. The components of the RSM system 100 may be operably connected to one another via a bus controller area network (not shown) that is included as an interconnected architecture that is operably connected to the components of the RSM system 100.

As discussed below, the communication unit 120 may be utilized to communicate data between the BCM 104 of the vehicle 102 and one or more mobile devices 122 that execute an accompanying rear seat monitoring application (RSM application) not shown. The one or more mobile devices 122 may be a computing device that includes a display screen 124 with user input (e.g., touch, keyboard), a processor 126 for computing, and a communication device 128 for communicating data (e.g., through one or more communication signals).

The one or more mobile devices 122 may include, but may not be limited to, handheld devices, mobile devices, smart phones, laptops, tablets and e-readers. As discussed in more detail below, the one or more mobile devices 122 may be utilized in certain circumstances to provide the alert to the driver of the vehicle 102. The one or more mobile devices 122 may additionally receive one or more inputs from the driver of the vehicle 102 to activate or deactivate the RSM system 100.

In one embodiment, the communication unit 120 may also be configured to communicate one or more signals to one or more portable devices 130 to determine the presence of the one or more portable devices 130 within or outside of a predetermined distance threshold of the vehicle 102. The one or more portable devices 130 may include a remote device such as a key fob that is pre-associated with the vehicle 102 and that includes a processor 132 for computing, one or more input buttons 134 to provide inputs and a communication device 136 for receiving and transmitting data remotely.

The one or more input buttons 134 may include a dismiss notification input button (not shown) that may be inputted to dismiss an audio/lighting notification provided by the RSM system 100. As discussed below, the communication unit 120 of the vehicle 102 may be configured to determine if the one or more portable devices 130 are located within or outside of the predetermined distance threshold of the vehicle 102 or outside the predetermined threshold based on signals sent and received to and from the one or more portable devices 130.

With particular reference again to the BCM 104 of the RSM system 100, in an exemplary embodiment, the BCM 104 may execute instructions to cause a function or action via one or more components of the RSM system 100. The BCM 104 may include logic, a software controlled microprocessor, and a memory device containing executing instructions that may be utilized to store data. In one embodiment, the BCM 104 may communicate with the power control unit 118 of the vehicle 102 to determine if the ignition status of the vehicle 102 is enabled or disabled. As discussed below, the BCM 104 may receive data from one or more of the components of the RSM system 100 to provide the driver with a reminder/alert at an end of a trip to check the rear seats of the vehicle 102 where there is a possibility of a presence of one or more rear seat passengers and/or objects within the vehicle 102.

The BCM 104 may be configured to communicate data to a head unit 108 of the vehicle 102. The head unit 108 of the vehicle 102 may include internal processing memory, an interface circuit, and bus lines for transferring data, sending commands, and communicating with the components of the system 100. In one or more embodiments, the head unit 108 may execute one or more operating systems, applications, and/or interfaces that are associated to the vehicle 200. The head unit 108 may be operably connected to one or more vehicle systems and components (not shown), including but not limited to, a vehicle infotainment system, a vehicle audio system, a vehicle light system, a vehicle horn. In some embodiments, the RSM system 100 may communicate with the head unit 108 to utilize the one or more vehicle systems and components to provide the one or more alerts to the driver of the vehicle 102.

As shown in FIG. 2, the head unit 108 may include and/or may be operably connected to one or more display screens 138. The one or more display screens 138 may be disposed at a center-stack area (not shown) of the vehicle 102 and may be configured as a center-stack display. Additionally, the one or more display screens 138 may be disposed at as a meter display that is presented near a speedometer (not shown) of the vehicle 102. In some configurations, the one or more display screens 138 configured as a center-stack and/or meter display may include a touch screen display (not shown) that may receive touch based user inputs from the driver. In some additional embodiments, the one or more display screens 138 may also be configured as a head-up display (HUD) that may be projected and presented on a windshield (not shown) or one or more additional windows (not shown) of the vehicle 102.

As discussed below, the RSM system 100 may include a rear seat monitoring interface (illustrative example shown in FIG. 3, discussed in more detail below), that may be presented to the driver of the vehicle 102 through the one or more display screens 138. In particular, the BCM 104 may communicate respective data to the head unit 108 to present one or more types of notifications/alerts that may include one or more types of interface layouts and configurations that are presented as part of the RSM interface. In certain circumstances, the BCM 104 may additionally communicate data to the communication unit 120 to communicate data to the one or more mobile devices 122 to present the one or more types of alerts that include the one or more types of interface layouts and configurations that are presented as part of the RSM interface via the respective display screen 124 of the one or more mobile devices 122. Additionally, the BCM 104 may communicate respective data to the head unit 108 to provide one or more types of visual and/or audial alerts that may be provided through the vehicle infotainment system, the vehicle audio systems, the vehicle lighting system and/or the vehicle horn.

In one or more embodiments, the storage unit 110 may store one or more operating systems, applications, associated operating system data, user interfaces, and the like that are executed by the ECU 106. In an exemplary embodiment, the storage unit 110 may store data (e.g., executable data files) that are associated with the RSM system 100. As discussed below, upon determination that one or more rear seat passengers/objects are located within the vehicle 102, the BCM 104 may access the storage unit 110 and may store a detection indication data flag that represents the determination that one or more rear seat passengers/objects are located within the one or more rear seats of the vehicle 102.

The detection-indication data flag may include data that pertains to the determined presence and the determined location of the one or more rear seat passengers within the vehicle 102. Alternatively, upon determination that one or more rear seat passengers/objects are not located within the vehicle 102, the BCM 104 may access the storage unit 110 and may store a non-detection indication flag that represents the determination that the one or more rear seat passengers/objects may not be located within the vehicle. As discussed below, the detection indication data flag or the non-detection indication data flag may be further analyzed by the BCM 104.

In one embodiment, during activation of the RSM system 100, the system 100 may utilize the vehicle camera system 112 to capture and provide video and/one or more still images of the interior cabin space of the vehicle 102 that includes the rear seats to the BCM 104 to be analyzed by the RSM system 100 to determine the presence of one or more passengers and/or objects within the one or more rear seats of the vehicle 102. Upon the vehicle camera system 112 capturing one or more images/video of the interior cabin space of the vehicle 102 that includes the rear seats of the vehicle 102, the vehicle camera system 112 may be configured to output image data that includes data associated with the images/video captured by the one or more cameras of the vehicle camera system 112.

The BCM 104 may analyze the image data to determine the presence of one or more rear seat passengers. In particular, the BCM 104 may be configured to execute image logic to analyze the image data to determine if one or more passengers/objects are located within the one or more rear seats of the vehicle 102. Based on the analyzation of the image data, the BCM 104 may determine if there is a presence of the one or more passengers/objects within the one or more rear seats of the vehicle 102. If the presence of one or more passengers is detected within the one or more rear seats of the vehicle 102, the BCM 104 may thereby access the storage unit 110 and may store the detection flag that includes one or more indications of the locations of the one or more passengers/objects within the one or more rear seats of the vehicle 102. If the BCM 104 does not determine locations of one or more of the passengers/objects within the one or more rear seats based on the analysis of the image data, the non-detection flag may be stored on the storage unit 110.

In one embodiment, based on the determination of the locations of one or more areas of the one or more passenger's body, the RSM system 100 may present one or more rear seat passengers shown as fully highlighted on the rear seat interface to ensure that the one or more rear seat passengers are fully visible to the driver of the vehicle 102 during the provision of the alert by the RSM system 100. In an exemplary embodiment, the vehicle microphone sensors 114 may include one or microphones (not shown) that may be disposed at one or more locations within the cabin of the vehicle 102. The vehicle microphone sensors 114 may be configured to capture audio within a rear portion that includes the rear seats of the vehicle 102 within the interior cabin of the vehicle 102. Upon capturing the audio, the vehicle microphone sensors 114 may output audio data to the BCM 104 to be analyzed.

Upon receipt of the audio data, the BCM 104 may analyze the audio data using audio logic to detect audio captured within the vehicle 102 that may be within one or more predetermined pitch and frequency thresholds that may be associated with the presence of one or more rear seat passengers. More specifically, the one or more predetermined pitch and frequency thresholds may be associated with the pitch and frequency of one or more captured sounds that may pertain to the movement, the voice, and/or the location of the one or passengers/objects within one or more areas of the rear portions of the vehicle 102 that include one or more respective rear seats of the vehicle 102 that is distinguishable from ambient noise of the vehicle 102.

In one embodiment, the BCM 104 may determine if one or more passengers/objects are located within one or more rear seats of the vehicle 102 based on the pitch and frequency of one or more captured sounds from the captured audio that may pertain to the movement, the voice/sounds (e.g. voice of a child, sounds related to a movement of a bag), and/or the location of the one or passengers/objects within one or more areas of the rear portions of the vehicle 102. Based on the analyzation of the audio data, the BCM 104 may determine if there is a presence of the one or more passengers/objects within the one or more rear seats of the vehicle 102. If the presence of one or more passengers is detected within the one or more rear seats of the vehicle 102, the BCM 104 may thereby access the storage unit 110 and may store the detection flag that includes one or more indications of the locations of the one or more passengers/objects within the one or more rear seats of the vehicle 102. If the BCM 104 does not determine locations of one or more of the passengers/objects within the one or more rear seats based on the analysis of the audio data, the non-detection flag may be stored on the storage unit 110.

In one or more embodiments, the vehicle door sensors 116 may be disposed at each of the doors of the vehicle 102. The vehicle door sensors 116 may be configured to detect the opening and/or the closing of each of the respective vehicle doors. In particular, upon the opening and/or closing of the one or more doors of the vehicle 200, the vehicle door sensors 116 may provide data to the BCM 104 to indicate the opening or closing of the particular door(s) that may include a driver side door (not shown), a passenger side front door (not shown), and one or more rear doors of the vehicle 200.

As discussed below, the BCM 104 may analyze data pertaining to the opening and closing of one or more rear doors of the vehicle 102 to enable and/or disable the RSM system 100 and/or provide one or more functions of the RSM system 100. In particular, upon detecting that one or more of the rear doors of the vehicle 102 are opened and closed prior to the ignition of the vehicle 102 being enabled, the RSM system 100 may be activated and the BCM 104 may utilize the vehicle camera system 112 to capture video/images and provide respective image data to the BCM 104. Additionally, the BCM 104 may utilize data pertaining to the opening and closing of the driver's side door (not shown) of the vehicle 102 to provide one or more types of alerts based on the determination that one or more rear seat passengers are located within the vehicle 102. In one embodiment, upon receiving data pertaining to the closure of one or more rear doors of the vehicle 102, the BCM 104 may access the storage unit 110 and may store a time stamp associated with the time of closure of the respective rear door(s) of the vehicle 102. As discussed below, the timestamp may be accessed and analyzed against a time that the ignition of the vehicle 102 is enabled to provide functions of the RSM system 100 or to deactivate the RSM system 100.

In one embodiment, the vehicle door sensors 116 may also be configured to detect the locking and unlocking of one or more doors of the vehicle 102. In particular, the vehicle door sensors 116 may be configured to send lock status data to the BCM 104 when one of the locks (not shown) of the respective doors of the vehicle 102 are locked or unlocked. In particular, the BCM 104 may receive the lock status data from the vehicle door sensors 116 when one or more locks of the vehicle 102 are locked to provide one or more types of alerts based on the determination that one or more rear seat passengers are located within the vehicle 102 upon determining that the driver's side door of the vehicle 102 is open.

In an exemplary embodiment, the power control unit 118 of the vehicle 102 may be configured to communicate ignition data to the BCM 104 that is associated with the ignition state of the engine of the vehicle 102 when one or more levels of power are provided to one or more components of the vehicle 102. In one embodiment, the power control unit 118 may communicate the ignition data when the driver of the vehicle 102 enables the engine of the vehicle 102 (e.g., via a push button start) or disables the engine of the vehicle 102. In an alternate embodiment, the power control unit 118 may communicate the ignition data when the driver of the vehicle 102 enables an accessory mode of the vehicle 102 (e.g., when power is supplied to one or more components of the vehicle 102 via a battery (not shown) of the vehicle 102) or disables the accessory mode of the vehicle 102. The BCM 104 may utilize the ignition data to determine when the ignition of the vehicle 102 is enabled and/or disabled and may thereby provide one or more functions of the RSM system 100.

In one embodiment, the communication unit 120 of the vehicle 102 may be configured to provide wireless computer communications utilizing various protocols to send/receive non-transitory signals internally to the plurality of components of the vehicle 102 and/or externally to external devices such as the one or more mobile devices 122 and the one or more portable devices 130 used by the driver of the vehicle 102 or one or more additional users (e.g., front seat passengers). Generally, these protocols include a wireless system (e.g., IEEE 802.11 (Wi-Fi), IEEE 802.15.1 (Bluetooth®)), a near field communication system (NFC) (e.g., ISO 13157), a local area network (LAN), and/or a point-to-point system.

More particularly, the communication unit 120 may allow connection of the one or more mobile devices 122 to the vehicle 102 to allow computer communication between components of the mobile device(s) 122 and the components of the vehicle 102. As discussed below, the BCM 104 may utilize the communication unit 120 to send data associated with the RSM system 100 to be analyzed by the RSM application that is executed on the one or more mobile devices 122 to thereby present the rear seat interface via the display screen 124 of the mobile device(s) 122.

In one or more embodiments, the communication unit 120 may be configured to transmit and receive one or more radio-frequency signals (RF signals) between the vehicle 102 and the one or more portable devices 130. As discussed below, the communication unit 120 may be configured to send data associated with one or more signals received from the one or more portable device(s) 130 that may include a device ID associated with the respective portable device(s) 130.

The BCM 104 may be configured to determine a signal strength (RSSI) value and/or a time of flight (TOF) value associated with the signal(s) communicated by the respective portable devices 130 to determine the presence of the one or more portable devices 130 within or outside of a predetermined distance threshold of the vehicle 102. Such a determination may be used by the BCM 104 to determine if the portable device(s) 130 carried by the driver of the vehicle 102 or passenger(s) of the vehicle 102 is located outside of the predetermined distance of the vehicle 102 upon disablement of the ignition of the vehicle 102 to provide one or more types of alerts.

II. Rear Seat Monitoring and Associated Methods

An overview of exemplary processes of enabling rear seat monitoring and providing one or more notification alerts associated with rear seat monitoring by the RSM system 100 will now be discussed with continued reference to FIG. 1 and FIG. 2. In an exemplary embodiment, the BCM 104 may receive data from the vehicle door sensors 116 when one or more rear doors of the vehicle 200 are opened or closed prior to ignition of the vehicle 102 being enabled. In particular, upon detecting that one of the vehicle doors are opened and closed prior to the ignition of the vehicle 200 being enabled, the RSM system 100 may be activated and the BCM 104 may activate and utilize the vehicle camera system 112 to capture video/images and provide respective image data to the BCM 104. Additionally, the vehicle microphone sensors 114 may provide audio data associated with the audio captured within the vehicle 102.

In one embodiment, upon analyzing the image data and audio data, the BCM 104 may determine if one or more rear seat passengers/objects are present or not present within the vehicle 102. Upon determining if one or more rear seat passengers/objects are present or not present within the vehicle 102, the BCM 104 may access the storage unit 110 and store the data flag that represents the determination or non-determination of the existence or non-existence of the one or more rear seat passengers within the vehicle 102. As discussed, the BCM 104 may store the detection indication data flag that indicates the determination that one or more rear seat passengers/objects are present within the vehicle 102. Alternatively, the BCM 104 may store the non-detection indication data flag that indicates the determination that one or more rear seat passengers/objects are not present within the vehicle 102.

In one or more embodiments, upon disablement of the ignition of the vehicle 102 by the driver (e.g., via a push button start), the power control unit 118 may communicate respective data to the BCM 104. The BCM 104 may access the storage unit 110 to retrieve the stored detection indication or non-detection indication regarding the determined existence or non-existence of the one or more rear seat passengers. Upon accessing the stored indication, and upon determining that the ignition of the vehicle 102 is disabled, the BCM 104 may send respective data to the head unit 108 to employ the one or more display screens 138 to present the rear seat interface.

Figure 3:
FIG. 3 is an illustrative example of a rear seat interface of the RSM system presented on a display screen according to an exemplary embodiment of the present disclosure.

In an exemplary embodiment, as shown in the illustrative example of FIG. 3, the rear seat interface 302 may be presented with a view of the interior cabin of the vehicle 102 that may include all of the rear seats of the vehicle 102. In the instance when the presence of one or more rear seat passengers/objects is detected in the vehicle 102, the rear seat interface 302 may be presented with an image/video feed of the interior cabin of the vehicle 102 as captured by the one or more cameras of the vehicle camera system 112. The image/video feed may be overlaid with one or more highlighted locations 304 that are presented at one or more of the rear seats where the presence of the one or more rear seat passengers/objects is detected (as stored within the detection indication data flag) by the BCM 104.

The image/video feed may also be overlaid with one or more user interface warning notifications 306 that pertain to the determined rear seat passengers/objects. Such warning notifications may be presented differently based on the determination of rear seat passengers as oppose to rear seat objects. Additionally, such warning notifications may be presented differently based on the determination of the presence of the one or more passengers/objects within the vehicle 102. For instance, when one or more rear seat passengers/objects is not determined to be located within the vehicle 102, the rear seat interface 302 may provide one or more notifications to the driver of the vehicle 102 to generally check the surroundings of the interior cabin of the vehicle 102 for any possible passengers/objects. In one or more embodiments, a dismiss user interface input button 308 may be presented to the driver to allow the driver to dismiss the user interface warning notifications and deactivate the RSM system 100, thereby deactivating the presentation of the rear seat interface 302.

Upon presenting the rear seat interface 302, the BCM 104 may communicate with the vehicle door sensors 116 to determine if a respective rear vehicle door(s) that is located near the one or more rear seats in which the presence of the rear seat passenger(s)/object(s) is detected is opened. If is determined that respective rear vehicle door(s) are detected to be opened based on data sent from the vehicle door sensors 116, the one or more user interface warning notifications may also be disabled.

In one or more embodiments, the BCM 104 may also communicate with the door sensors to determine if the respective vehicle door(s) that is located near the one or more rear seats in which the presence of the rear seat passenger(s)/object(s) is detected is put into a locked state. The BCM 104 may communicate with the head unit 108 to employ the horn of the vehicle 102 to actuate the horn to provide repetitive honk/beep notifications. In some configurations, the BCM 104 may additionally communicate with the head unit 108 to employ the lighting system of the vehicle 102 to actuate repetitive flashing of one or more external lights (e.g., head lights) of the vehicle 102 to capture the driver's attention as to the existence of the rear seat passenger(s)/object(s) within the vehicle 102.

In one or more embodiments, the BCM 104 may also utilize the communication unit 120 to determine if one or more portable devices may be located outside of a predetermined distance of the vehicle 102. This may indicate that the driver of the vehicle 102 has departed away from the vehicle 102 and is a particular distance away from the vehicle 102. If the BCM 104 determines that the portable device(s) is outside of the predetermined distance of the vehicle 102, the BCM 104 may employ the communication unit 120 to send data associated with the RSM system 100 to be analyzed by the RSM application that is executed on the one or more mobile devices 122 to thereby present the rear seat interface via the display screen 124 of the mobile device(s) 122.

Figure 4:
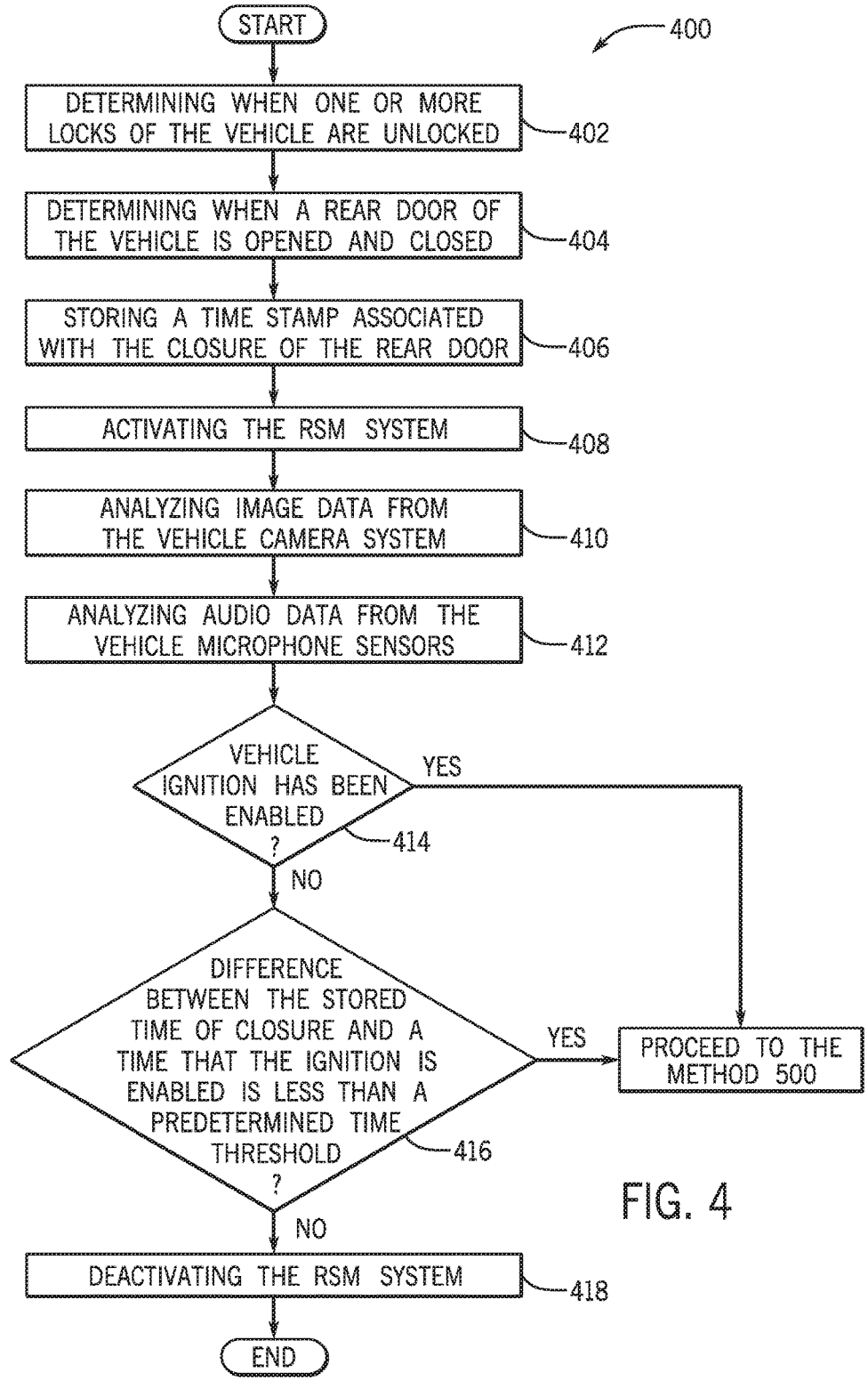
FIG. 4 is an illustrative process flow diagram method executed by the RSM system to sense an operation of one or more rear doors of the vehicle and to determine enablement of an ignition of the vehicle according to an exemplary embodiment of the present disclosure.

FIG. 4 is an illustrative process flow diagram of a method 400 executed by the RSM system 100 to sense the operation of one or more rear doors of the vehicle 102 and to determine enablement of the ignition of the vehicle 102 according to an exemplary embodiment of the present disclosure. The method 400 of FIG. 4 will be described with reference to the components of FIG. 1 and FIG. 2, though it is to be appreciated that the method 400 of FIG. 4 may be used with other systems and/or components. The method 400 may begin at block 402, wherein the method 400 may include determining when one or more locks of the vehicle 102 are unlocked.

In one embodiment, the vehicle door sensors 116 may monitor the locks of each of the doors of the vehicle 102 to determine when one or more of the locks of the vehicle 102 are changed from a locked state to an unlocked state. Upon determining that one or more of the locks of the vehicle 102 are changed from the locked state to the unlocked state, the vehicle door sensors 116 may communicate lock status data indicating the unlocked state of the one or more particular locks of the one or more respective doors of the vehicle 102. The lock status data may indicate the one or more specific locks of the one or more specific doors that are unlocked. The BCM 104 may receive the lock status data from the vehicle door sensors 116 when one or more locks of the vehicle 102 and the BCM 104 may thereby determine when one or more locks of the vehicle 102 are unlocked. Therefore, if the driver or passenger(s) of the vehicle 102 unlocks one or more locks of the vehicle 102 using one or more of the portable device(s) 130, the BCM 104 determines that the one or more of the locks of the vehicle 102 are unlocked.

The method 400 may proceed to block 404, wherein the method 400 may include determining when the rear door(s) of the vehicle 102 is opened and closed. In one or more embodiments, the vehicle door sensors 116 may further monitor the operation of the one or more rear doors of the vehicle to determine when the one or more rear doors of the vehicle 102 are opened. Upon determining that the one or more rear doors of the vehicle 102 are opened, the vehicle door sensors 116 may communicate respective data to the BCM 104.

Upon determining that one or more of the rear doors of the vehicle 102 are opened, the BCM 104 may initiate a trigger to further communicate with the vehicle door sensors 116 to determine when the one or more of the rear doors of the vehicle 102 are subsequently closed. Upon receiving data regarding the closure of the one or more rear doors of the vehicle 102 from the vehicle door sensors 116, the BCM 104 may determine that one or more of the respective rear doors of the vehicle 102 are closed.

The method 400 may proceed to block 406, wherein the method 400 may include storing a time stamp associated with the closure of the rear door(s). In an exemplary embodiment, upon determining that one or more of the rear doors of the vehicle 102 are closed, the BCM 104 may communicate with the ECU 106 to determine a time of closure of the one or more rear doors of the vehicle 102. The ECU 106 may provide the time of closure based on a system clock that may be executed by the ECU 106. Upon receiving the time of closure from the ECU 106, the BCM 104 may access the storage unit 110 of the vehicle 102 and may store a time stamp (e.g., data file) on the storage unit 110 that includes the time of closure of the one or more rear doors that are determined to be opened and closed (at block 404).

The method 400 may proceed to block 408, wherein the method 400 may include activating the RSM system 100. Upon the BCM 104 determining that the one or more of the rear doors of the vehicle 102 are closed and upon storing the time stamp associated with the closure of the one or more rear doors, the BCM 104 may activate the RSM system 100 and thereby activate the vehicle camera system 112 and the vehicle microphone sensors 114 to communicate image data and audio data to the BCM 104 to be utilized to provide functionality of the RSM system 100. In particular, upon activation of the RSM system 100, the vehicle camera system 112 may be activated to capture images of the one or more rear seats of the vehicle 102. The vehicle microphone sensors 114 may additionally be activated to capture audio within the rear portion(s) of the interior cabin of the vehicle 102 which includes the one or more rear seats of the vehicle 102.

The method 400 may proceed to block 410, wherein the method 400 may include analyzing image data from the vehicle camera system 112. In one or more embodiments, upon activation of the vehicle camera system 112, the one or more cameras of the vehicle camera system 112 may be utilized to capture images/video of the rear seats of the vehicle 102. Upon the vehicle camera system 112 capturing one or more images/video of one or more passengers of the vehicle 102, the vehicle camera system 112 may be configured to output image data that includes data associated with the images/video captured by the one or more cameras of the vehicle camera system 112. Upon receipt of the image data, the BCM 104 may analyze the image data from the vehicle camera system 112.

As discussed above, the BCM 104 may be configured to execute the image logic to determine if one or more passengers/objects are located within the one or more rear seats of the vehicle 102. Based on the analyzation of the image data, the BCM 104 may access the storage unit 110 and may store the detection indication data flag or the non-detection indication data flag. If one or more passengers/objects are determined to be located within the one or more rear seats of the vehicle 102, the detection indication data flag may include one or more indications of the locations of the one or more passengers/objects within the one or more rear seats of the vehicle 102. If one or more passengers/objects are not determined to be located within the one or more rear seats of the vehicle 102, the non-detection indication data flag may include an indication indicating the non-presence of the rear seat passengers/objects.

The method 400 may proceed to block 412, wherein the method 400 may include analyzing audio data from the vehicle microphone sensors 114. As discussed above, the vehicle microphone sensors 114 may communicate audio data to the BCM 104. The audio data may be associated with the audio captured by the one or more microphones within the vehicle 102. Upon receipt of the audio data the BCM 104 may analyze the audio data using the audio logic to detect audio captured within the vehicle 102 that may be within one or more predetermined pitch and frequency thresholds that may be associated with the presence of one or more rear seat passengers.

In one embodiment, the BCM 104 may determine if one or more passengers/objects are located within one or more rear seats of the vehicle 102 based on the pitch and frequency of one or more captured sounds that may pertain to the movement, the voice, and/or the location of the one or more passengers/objects within one or more areas of the rear portions of the vehicle 102. If one or more passengers/objects are determined to be located within the one or more rear seats of the vehicle 102, the BCM 104 may store the detection indication data flag if it has not been already stored (at block 410). If the detection indication data flag had already been stored (at block 410), the BCM 104 may retrieve the data flag and add an indication(s) as to the determination of captured sounds that may pertain to the location of the one or more passengers/objects within the vehicle 102.

If one or more passengers/objects are not determined to be located within the one or more rear seats of the vehicle 102, the BCM 104 may access the storage unit 110 to ensure that a detection data flag was not stored on the storage unit 110 (at block 410). If the detection data flag was previously stored, the BCM 104 may not store the non-detection data flag based on the audio data. Alternatively, if the non-detection data flag was stored (at block 410), the BCM 104 may retrieve the data flag and add an indication(s) as to the determination that one or more passengers/objects were not detected within the vehicle 102 based on the audio data provided by the vehicle microphone sensors 114.

In one embodiment, the analysis of audio data may be completed as a confirmatory step to ensure that one or more passengers/objects are determined or not determined to be located within the one or more rear seats of the vehicle 102. In an alternate embodiment, the analysis of audio data may be completed if one or more passengers/objects are not determined to be located within the one or more rear seats of the vehicle 102 based on the analysis of image data. In additional embodiments, the BCM 104 may aggregate the image data and the audio data to determine if one or more rear seat passengers/objects are located within the one or more rear seats of the vehicle 102. In some embodiments, if the BCM 104 determines that the one or more rear seat passengers/objects are located within the one or more rear seats of the vehicle 102 based on the aggregated data, the BCM 104 may also determine aggregated locations of one or more passengers/objects within the one or more specific rear seats of the vehicle 102 that are based on aggregated image data and audio data associated with the captured images/video and sound.

The method 400 may proceed to block 414, wherein the method 400 may include determining if the vehicle ignition has been enabled. In one embodiment, upon the enablement of the engine of the vehicle 102, the power control unit 118 may provide indication of the vehicle ignition being enabled. In an alternate embodiment, upon enablement of the accessory mode of the vehicle 102, the power control unit 118 may provide the ignition data that includes an indication of the vehicle ignition being enabled. Upon determining that the vehicle ignition is enabled, the power control unit 118 may communicate the ignition data that includes an indication of the vehicle ignition being disabled to the BCM 104. Therefore, the BCM 104 may determine that the ignition of the vehicle 102 has been enabled or that the vehicle ignition has not been enabled (as of yet).

If it is determined that the vehicle ignition has not been enabled (at block 414), the method 400 may proceed to block 416, wherein the method 400 may include determining if a difference between the stored time of closure and a time that the ignition is enabled is less than a predetermined time threshold. In an exemplary embodiment, upon determining that the vehicle ignition is not yet enabled (at block 414), the BCM 104 may access the storage unit 110 to retrieve the time stamp associated with the closure of the rear door(s) (stored at block 406). Upon retrieving the stored time stamp, the BCM 104 may communicate with the power control unit 118 to determine when the ignition of the vehicle 102 is thereby enabled. As discussed, the power control unit 118 may communicate ignition data to the BCM 104 that is associated with the enablement of the ignition upon determining that the ignition has been enabled.

Upon determining that the ignition has been enabled, the BCM 104 may communicate with the ECU 106 to determine a time of enablement of the ignition. The ECU 106 may provide the time of enablement of the ignition to the BCM 104 based on the system clock that may be executed by the ECU 106. In one or more embodiments, the BCM 104 may determine if a difference between the time of closure of the one or more rear doors of the vehicle 102 that is retrieved from the stored time stamp and the time of enablement of the ignition of the vehicle 102 is less than a predetermined time threshold (e.g., ten minutes).

If it is determined that the difference between the stored time of closure and the time that the ignition of the vehicle is enabled is more than a predetermined period of time (at block 416), the method 400 may proceed to block 418, wherein the method 400 may include deactivating the RSM system 100. Upon the BCM 104 determining that the difference in time between the closure of the one or more rear doors of the vehicle 102 and the enablement of the ignition of the vehicle 102 is above the predetermined period of time (e.g., the amount of time between the closure of the rear door(s) and the enablement of the ignition is above ten minutes), the BCM 104 may deactivate the RSM system 100 and thereby deactivate the sending of data to the RSM system 100 from the vehicle camera system 112 and the vehicle microphone sensors 114.

Additionally, upon the BCM 104 determining that the difference in time is above the predetermined period of time, the vehicle camera system 112 may no longer capture images/video and the vehicle microphone sensors 114 may no longer capture audio to be analyzed by the BCM 104 to provide functionality associated with the RSM system 100. If it is determined that the vehicle ignition has been enabled (at block 414) or that the difference between the stored time of closure and the time that the ignition is enabled is less than a predetermined time threshold (at block 416), the BCM 104 may execute the method 500 of FIG. 5, as discussed in more detail below.

Figure 5:
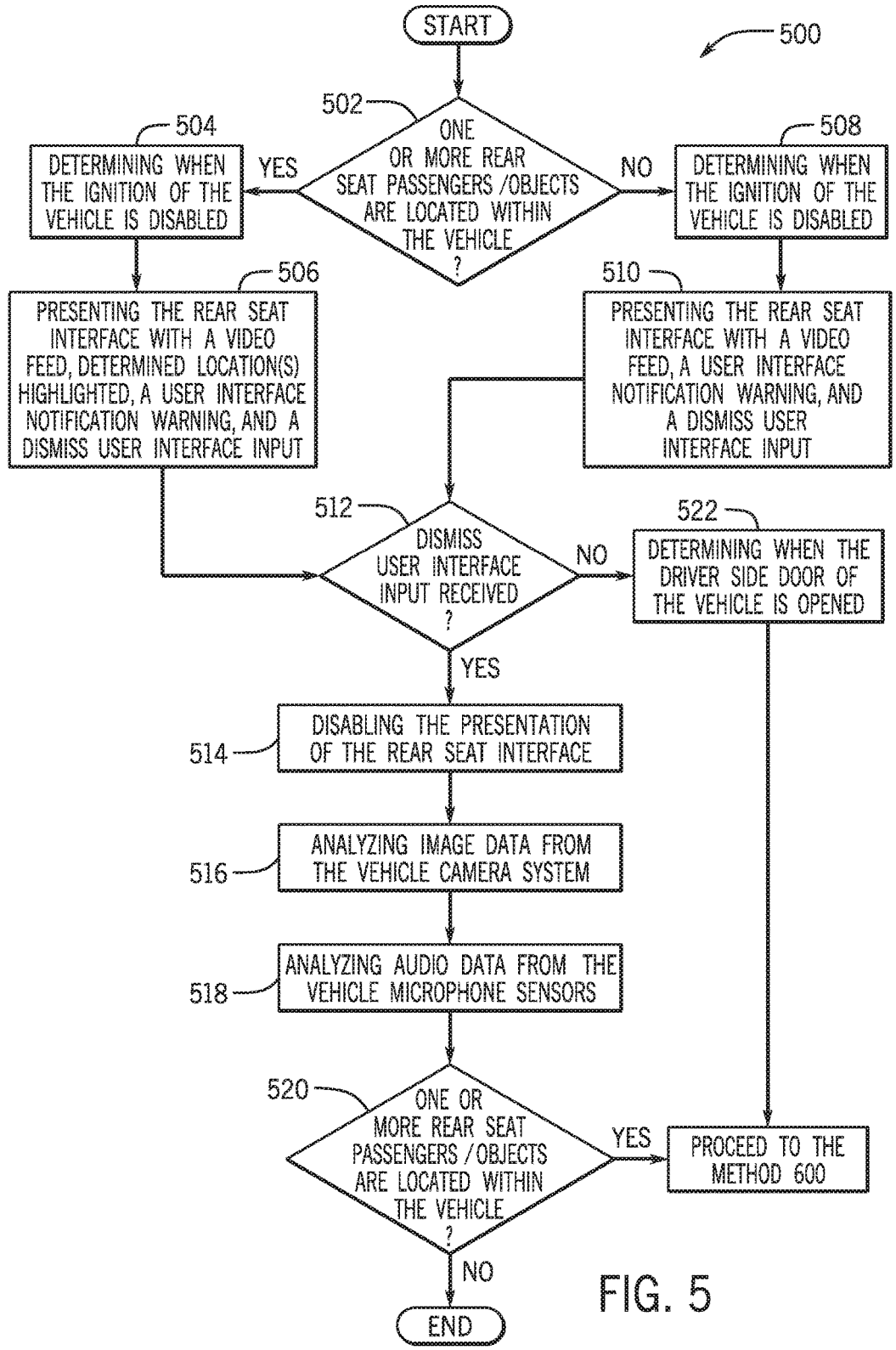
FIG. 5 is a process flow diagram of a method executed by the RSM system to provide one or more types of alerts based on if one or more rear seat passengers/objects are determined to be located within the vehicle according to an exemplary embodiment of the present disclosure.

FIG. 5 is a process flow diagram of a method 500 executed by the RSM system 100 to provide one or more types of alerts based on if one or more rear seat passengers/objects are determined to be located within the vehicle 102 according to an exemplary embodiment of the present disclosure. The method 500 of FIG. 5 will be described with reference to the components of FIG. 1 and FIG. 2, though it is to be appreciated that the method 500 of FIG. 5 may be used with other systems and/or components. The method 500 may begin at block 502, wherein the method 500 may include determining if one or more rear seat passengers/objects are located within the vehicle 102.

In one embodiment, the BCM 104 may access the storage unit 110 to retrieve the detection indication data flag or the non-detection indication data flag previously stored by the BCM 104 (at block 410 and/or block 412). Based on the retrieval of the detection indication data flag or the non-detection indication data flag, the BCM 104 may determine if the presence of one or more rear seat passengers/objects are detected.

If it is determined that the one or more rear seat passengers/objects are located within the vehicle 102 (at block 502), the method 500 may proceed to block 504, wherein the method 500 may include determining when the ignition of the vehicle 102 is disabled. In one embodiment, upon the disablement of the engine of the vehicle 102, the power control unit 118 may provide the ignition data with an indication of the vehicle ignition being disabled. In an alternate embodiment, upon disablement of the accessory mode of the vehicle 102, the power control unit 118 may provide the ignition data with an indication of the vehicle ignition being disabled. Upon determining that the vehicle ignition is disabled, the power control unit 118 may communicate respective data to the BCM 104. The BCM 104 may responsively determine that the ignition of the vehicle 102 has been disabled.

The method 500 may proceed to block 506, wherein the method 500 may include presenting the rear seat interface with a video feed, determined location(s) highlighted, a user interface notification warning, and a dismiss user interface input. In an exemplary embodiment, upon determining the presence of the one or more rear seat passengers/objects, the BCM 104 may communicate respective data to the head unit 108 to present the rear seat interface via the one or more display screens 138. The BCM 104 may utilize the one or more display screens 138 to present the rear seat interface to the driver of the vehicle 102.

The rear seat interface may include the image/video feed of the interior cabin of the vehicle 102 that includes the one or more rear seats of the vehicle 102 and/or the one or more passengers/objects located within the one or more rear seats that may be overlaid with one or more highlighted locations. The one or more highlighted locations may be presented where the one or more rear seat passengers/objects are determined to be located based on the analysis of the detection indication data flag. The image/video feed of the interior cabin of the vehicle 102 may also be overlaid with one or more user interface warning notifications that pertain to the detected rear seat passengers/objects. In some embodiments, the rear seat interface may be presented with specific notifications pointing out other attributes within the vehicle 102 (e.g., car seats, seat belts, etc.).

In one embodiment, the rear seat interface may additionally include text notifying the driver of the vehicle 102 that the presence of one or more passengers/objects has been determined within the one or more rear seats of the vehicle 102. For example, the rear seat interface may include a user interface notification that includes the text "MOVEMENT DETECTED, LOOK IN THE REAR." The image/video feed of the interior cabin of the vehicle 102 may also be overlaid with one or more user interface warning textual notifications that pertain to the detected rear seat passengers/objects. In some additional embodiments, the BCM 104 may additionally utilize the head unit 108 to communicate with the infotainment system and/or the audio system to actuate internal speakers (not shown) of the vehicle 102 to provide the audial warning alert (e.g., buzzer, chime) to alert the driver of the vehicle 102 of the determined presence of the one or more rear seat passengers/objects within the vehicle 102. The BCM 104 may additionally present the dismiss user interface input button to the driver to provide an option to dismiss the user interface warning notifications and cease presentation of the rear seat interface.

Referring again to block 502, if it is determined that one or more rear seat passengers/objects are not located within the vehicle 102, the method 500 may proceed to block 508, wherein the method 500 may include determining when the ignition of the vehicle 102 is disabled. In one embodiment, upon the disablement of the engine of the vehicle 102, the power control unit 118 may provide the ignition data with an indication of the vehicle ignition being disabled. In an alternate embodiment, upon disablement of the accessory mode of the vehicle 102, the power control unit 118 may provide the ignition data with an indication of the vehicle ignition being disabled. Upon determining that the vehicle ignition is disabled, the power control unit 118 may communicate respective data to the BCM 104. The BCM 104 may responsively determine that the ignition of the vehicle 102 has been disabled.

The method 500 may proceed to block 510, wherein the method 500 may include presenting the rear seat interface with a video feed, a user interface notification warning, and a dismiss user interface input. In one embodiment, the BCM 104 may send respective data to the head unit 108 to present the rear seat interface via the one or more display screens 138. In an exemplary embodiment, the BCM 104 may utilize the one or more display screens 138 to present the rear seat interface to the driver of the vehicle 102 that includes a video/image feed of the cabin of the vehicle 102 that may include all of the rear seats of the vehicle 102 as captured by the one or more cameras of the vehicle camera system 112. The rear seat interface may additionally include a user interface notification that notifies the driver of the vehicle 102 to check the rear seats of the vehicle 102. The BCM 104 may additionally present the dismiss user interface input button to the driver to provide an option to dismiss the user interface warning notifications and cease presentation of the rear seat interface.

Upon the presentation of the rear seat interface (at block 506 or at block 510), the method 500 may proceed to block 512, wherein the method 500 may include determining if the dismiss user interface input is received. As discussed above, the rear seat interface may be presented with the dismiss user interface input (at block 506 and 510) that may be inputted to allow the driver to dismiss the user interface notification warning(s) presented via the rear seat interface. In one embodiment, upon receiving an input by the driver on the dismiss user interface input, the head unit 108 may communicate respective data associated with the received input to the BCM 104. If the input is not received by the driver on the dismiss user interface input, the head unit 108 may not communicate respective data associated with the received input to the BCM 104. In an exemplary embodiment, the BCM 104 may determine that the dismiss user interface input is inputted by the driver based on the receipt of the respective data associated with the input from the head unit 108. Alternatively, the BCM 104 may determine that the dismiss user interface input is not inputted by the driver when respective data associated with the input from the head unit 108 is not received by the BCM 104.

If it is determined that the dismiss user interface input is received (at block 512), the method 500 may proceed to block 514, wherein the method 500 may include disabling the presentation of the rear seat interface. In one embodiment, when it is determined that the driver has inputted the dismiss user interface input, the BCM 104 may disable presentation of the rear seat interface on the display screen(s) 138. In particular, the BCM 104 may communicate the disablement of the presentation of the rear seat interface to the head unit 108. The head unit 108 may responsively cease presentation of the rear seat interface via the display screens 138. In some embodiments, when the presence of one or more rear seat passengers/objects is detected (at block 502), the head unit 108 may additionally communicate with the infotainment system and/or the audio system to cease the audial warning alert within the vehicle 102.

The method 500 may proceed to block 516, wherein the method 500 may include analyzing the image data from the vehicle camera system 112. In one embodiment, the BCM 104 may communicate with the vehicle camera system 112 to receive real time image data as a confirmatory step to ensure that one or more passengers/objects are not located within the vehicle 102 a predetermined amount of time after the driver inputs the dismiss user interface input button to disable the presentation of the rear seat interface and related notification alerts. Upon the receipt of image data, the BCM 104 may analyze the image data to determine if one or more passengers/objects are located within one or more of the rear seats of the vehicle 102.

The method 500 may proceed to block 518, wherein the method 500 may include analyzing audio data from the vehicle microphone sensors 114. In one embodiment, the BCM 104 may communicate with the vehicle microphone sensors 114 to receive real time audio data as an additional confirmatory step to ensure that one or more passengers/objects are not located within the vehicle 102 a predetermined amount of time after the driver inputs the dismiss user interface input button to disable the presentation of the rear seat interface and related notification alerts. Upon the receipt of audio data, the BCM 104 may analyze the audio data to determine if one or more passengers/objects are located within one or more of the rear seats of the vehicle 102.

The method 500 may proceed to block 520, wherein the method 500 may include determining if one or more rear seat passengers/objects are located within the vehicle 102. In an exemplary embodiment, the BCM 104 may determine if the presence of one or more rear seat passengers is detected based on the analysis of the image data separately from the audio data. In some embodiments, the BCM 104 may aggregate the image data and audio data to determine if one or more rear seat passengers/objects are located within the one or more rear seats of the vehicle 102. In some embodiments, if the BCM 104 determines that the one or more rear seat passengers/objects are located within the one or more rear seats of the vehicle 102 based on the aggregated data, the BCM 104 may also determine aggregated locations of one or more passengers/objects within the one or more specific rear seats of the vehicle 102 that are based on captured images/video and sound.

If it is determined that one or more rear seat passengers/objects are located within the vehicle 102 (at block 520), the BCM 104 may execute the method 600 of FIG. 6, as discussed in more detail below. Referring again to block 512, if it is determined that the dismiss user interface input is not received upon the presentation of the rear seat interface (at block 506 or at block 510), the method 500 may proceed to block 522, wherein the method 500 may include determining when the driver side door of the vehicle 102 is opened.

In one or more embodiments, the vehicle door sensors 116 may further monitor the operation of the driver's side door of the vehicle 102 to determine when the driver's side door of the vehicle 102 is opened by the driver. Upon determining that the driver's side door of the vehicle 102 is opened, the vehicle door sensors 116 may communicate respective data to the BCM 104. Upon determining that the driver side door of the vehicle 102 is opened, the BCM 104 may execute the method 600 of FIG. 6, as discussed in more detail below.

Figure 6:
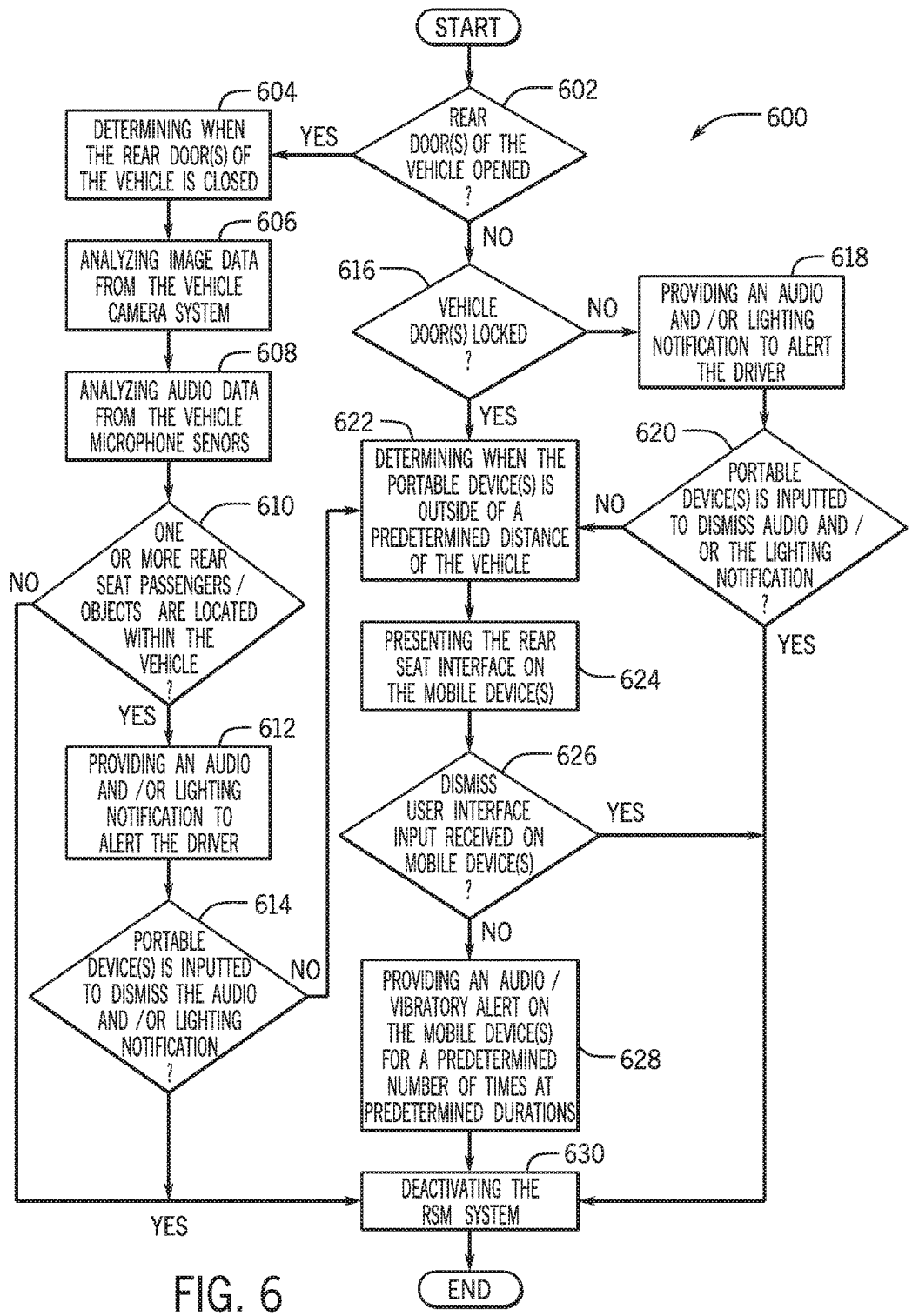
FIG. 6 is an illustrative process flow diagram of a method to provide one or more types of alerts based on if the one or more rear doors of the vehicle are opened upon disablement of the ignition of the vehicle according to an exemplary embodiment of the present disclosure.

FIG. 6 is an illustrative process flow diagram of a method 600 to provide one or more types of alerts based on if the one or more rear doors of the vehicle 102 are opened upon disablement of the ignition of the vehicle 102 according to an exemplary embodiment of the present disclosure. The method 600 of FIG. 6 will be described with reference to the components of FIG. 1 and FIG. 2, though it is to be appreciated that the method 600 of FIG. 6 may be used with other systems and/or components. The method 600 may begin at block 602, wherein the method 600 may include determining if the rear door(s) of the vehicle 102 is opened.

In an exemplary embodiment, upon determining that the driver side door of the vehicle 102 is opened (at block 522 of the method 500), the BCM 104 may communicate with the vehicle door sensors 116 to determine if one or more of the rear doors of the vehicle 102 are opened. As discussed above, upon determining that the one or more rear doors of the vehicle 102 are opened, the vehicle door sensors 116 may communicate respective data to the BCM 104.

If it is determined that the rear door(s) of the vehicle 102 is opened (at block 602), the method 600 may proceed to block 604, wherein the method 600 may include determining when the rear door(s) of the vehicle 102 is closed. In one embodiment, upon determining that one or more of the rear doors of the vehicle 102 are opened, the BCM 104 may initiate a trigger to further communicate with the vehicle door sensors 116 to determine when the one or more of the rear doors of the vehicle 102 are subsequently closed. Upon receiving data regarding the closure of the one or more rear doors of the vehicle 102 from the vehicle door sensors 116, the BCM 104 may determine that one or more of the respective rear doors of the vehicle 102 are closed.

The method 600 may proceed to block 606, wherein the method 600 may include analyzing image data from the vehicle camera system 112. In one embodiment, the BCM 104 may communicate with the vehicle camera system 112 to receive real time image data as a confirmatory step to ensure that one or more passengers/objects are not located within the vehicle 102 after the one or more rear doors of the vehicle 102 are determined to be closed (at block 604). Upon the receipt of image data, the BCM 104 may analyze the image data to determine if one or more passengers/objects are located within one or more of the rear seats of the vehicle 102.

The method 600 may proceed to block 608, wherein the method 600 includes analyzing audio data from the vehicle microphone sensors 114. In one embodiment, the BCM 104 may communicate with the vehicle microphone sensors 114 to receive real time audio data as an additional confirmatory step to ensure that one or more passengers/objects are not located within the vehicle 102 after the one or more rear doors of the vehicle 102 are determined to be closed (at block 604). Upon the receipt of audio data, the BCM 104 may analyze the audio data to determine if one or more passengers/objects are located within one or more of the rear seats of the vehicle 102.

The method 600 may proceed to block 610, wherein the method 600 may include determining if one or more rear seat passengers/objects are located within the vehicle 102. In an exemplary embodiment, the BCM 104 may determine if the presence of one or more rear seat passengers is detected based on the analysis of the image data separately from the audio data. The BCM 104 may determine the presence of one or more passengers/objects based on the image data and/or the audio data. In some embodiments, the BCM 104 may aggregate the image data and audio data to determine if one or more rear seat passengers/objects are located within the one or more rear seats of the vehicle 102. In some embodiments, if the BCM 104 determines that the one or more rear seat passengers/objects are located within the one or more rear seats of the vehicle 102 based on the aggregated data, the BCM 104 may also determine aggregated locations of one or more passengers/objects within the one or more specific rear seats of the vehicle 102 that are based on captured images/video and sound.

If it is determined that one or more rear seat passengers/objects is located within the vehicle 102 (at block 610), the method 600 may proceed to block 612, wherein the method 600 may include providing an audio and/or lighting notification to alert the driver. In an exemplary embodiment, the BCM 104 may communicate with the head unit 108 to employ the horn of the vehicle 102 to actuate the horn to provide repetitive honk/beep notifications. In some embodiments, the BCM 104 may additionally or alternatively communicate with the head unit 108 to employ the lighting system of the vehicle 102 to actuate repetitive flashing of one or more external lights (e.g., head lights) of the vehicle 102 to capture the driver's attention as to the determination of the rear seat passenger(s)/object(s) within the vehicle 102. As an illustrative example, if one or more rear seat passengers is determined to be located within the vehicle 102 (at block 610) after determining that the rear doors of the vehicle 102 are opened and subsequently closed (at blocks 602 and 604), the BCM 104 may provide the audio and/or lighting notification to alert the driver of the presence of the one or more rear seat passengers/objects.

The method 600 may proceed to block 614, wherein the method 600 may include determining if the portable device(s) 130 is inputted to dismiss the audio and/or lighting notification. As discussed above, the portable device(s) 130 may include one or more input buttons 134 that may include a dismiss notification input button that may be inputted to dismiss an audio/lighting notification provided by the RSM system 100. Upon the input of the dismiss notification input button, the communication device 128 of the portable device(s) 130 may transmit a respective signal to the communication unit 120 of the vehicle 102 to be communicated to the BCM 104. The BCM 104 may determine that the portable device(s) 130 is inputted to dismiss the audio and/or the lighting notification. Alternatively, if the BCM 104 does not receive the respective communication pertaining to the inputting of the dismiss notification input button of the portable device(s) 130, the BCM 104 may determine that the portable device(s) 130 input to dismiss the audio and/or lighting notification is not received.

Referring again to block 602, if it is determined that the rear door(s) of the vehicle 102 is not opened, the method 600 may proceed to block 616, wherein the method 600 may include determining if the vehicle door(s) is locked. In one embodiment, the vehicle door sensors 116 may monitor the locks of each of the doors of the vehicle 102 to determine when one or more of the locks of the vehicle 102 are changed from the unlocked state to an locked state (e.g., when the driver's side door changes from the unlocked state to the locked state). Upon determining that one or more of the locks of the vehicle 102 are changed from the unlocked state to the locked state, the vehicle door sensors 116 may communicate lock status data indicating the locked state of the one or more particular locks of the one or more respective doors of the vehicle 102. The lock status data may indicate the one or more specific locks of the one or more specific doors that are locked. The BCM 104 may receive the lock status data from the vehicle door sensors 116 when one or more locks of the vehicle 102 and the BCM 104 may thereby determine when one or more locks of the vehicle 102 are locked. Therefore, if the driver or passenger(s) of the vehicle 102 locks one or more locks of the vehicle 102 using one or more of the portable device(s) 130, the BCM 104 determines that the one or more of the locks of the vehicle 102 are locked.

If it is determined that the vehicle door(s) are not locked (at block 616), the method 600 may proceed to block 618, wherein the method 600 may include providing an audio and/or lighting notification to alert the driver. In one embodiment, the BCM 104 may communicate with the head unit 108 to employ the horn of the vehicle 102 to actuate the horn to provide repetitive honk/beep notifications. In some embodiments, the BCM 104 may additionally or alternatively communicate with the head unit 108 to employ the lighting system of the vehicle 102 to actuate repetitive flashing of one or more external lights (e.g., head lights) of the vehicle 102 to capture the driver's attention as to the possibility of the presence of the rear seat passenger(s)/object(s) within the vehicle 102. As an illustrative example, if the vehicle door(s) is determined to remain unlocked (at block 616), after a predetermined period of time the BCM 104 may provide the audio and/or the lighting notification to alert the driver of the possibility of the presence of one or more rear seat passengers/objects within the vehicle 102 (as determined at block 520 of the method 500).

The method may proceed to block 620, wherein the method 600 may include determining if the portable device(s) 130 is inputted to dismiss the audio and/or lighting notification. Upon the input of the dismiss notification input button, the communication device 128 of the portable device(s) 130 may send transmit a respective signal to the communication unit 120 of the vehicle 102 to be communicated to the BCM 104. The BCM 104 may determine that the portable device(s) 130 is inputted to dismiss the audio and/or the lighting notification. Alternatively, if the BCM 104 does not receive the respective communication pertaining to the inputting of the dismiss notification input button of the portable device(s) 130, the BCM 104 may determine that the portable device(s) 130 input to dismiss the audio and/or lighting notification is not received.

If it is determined that the portable device(s) 130 input to dismiss the audio and/or the lighting notification is not received (at block 620), the method 600 may proceed to block 622, wherein the method 600 may include determining when the portable device(s) 130 is outside of a predetermined distance of the vehicle 102. In an exemplary embodiment, the BCM 104 may communicate with the ECU 106 to utilize the communication unit 120 of the vehicle 102 to transmit one or more polling signals (e.g., RF signals) to the one or more portable devices 130. If the one or more portable devices 130 are within a particular distance of the vehicle 102 that are in range to receive the one or more polling signals that are transmitted by the one or more portable devices 130, the one or more portable devices 130 may utilize the communication device 136 to transmit one or more response signals (e.g., RF signals) to the communication unit 120 to the vehicle 102.

In one or more embodiments, upon the receipt of the one or more response signals by the communication unit 120 of the vehicle 102, the communication unit 120 may provide signal data to the BCM 104. The BCM 104 may be configured to evaluate the signal data and may determine a RSSI value and/or a TOF value associated with the each of the one or more signals communicated by the one or more respective portable devices 130. In particular, the BCM 104 may evaluate one or more RSSI values and/or one or more TOF values of the one or more response signals against one or more RSSI value thresholds and/or one or more TOF value thresholds to determine if the presence if the one or more portable devices 130 within or outside of a predetermined distance threshold of the vehicle 102.

As an illustrative example, if the driver exits the vehicle 102 and walks away from the vehicle 102 as he/she carries the portable device(s) 130, the portable device(s) 130 may be carried outside of the predetermined distance of the vehicle 102. Upon the portable device(s) 130 being carried outside the predetermined distance of the vehicle 102, the BCM 104 may determine that the portable device(s) 130 is outside of the predetermined distance of the vehicle 102 based on the comparison of RSSI value(s) and/or TOF value(s) against the RSSI value threshold(s) and/or the TOF value threshold(s).

The method 600 may proceed to block 624, wherein the method 600 includes presenting the rear seat interface on the mobile device(s) 122. In one embodiment, upon determining that the portable device(s) 130 are located outside of the predetermined distance of the vehicle 102, the BCM 104 may employ the communication unit 120 of the vehicle 102 to communicate data to the mobile device(s) 122 via the communication device 128. In particular, the BCM 104 may utilize the communication unit 120 to send data associated with the RSM system 100 to be analyzed by the RSM application that is executed on the one or more mobile devices 122 to thereby present the rear seat interface via the display screen 124 of the mobile device(s) 122.

In one or more embodiments, the rear seat interface may be presented via the display screen 124 with a video feed, determined location(s) highlighted, a user interface notification warning, and a dismiss user interface input. The rear seat interface may include the image/video feed of the interior cabin of the vehicle 102 that includes the rear seats of the vehicle 102 and/or the one or more passengers/objects that may be overlaid with one or more highlighted locations that are presented where the presence of the one or more rear seat passengers/objects is determined based on the analysis of the detection indication data flag. The image/video feed of the interior cabin of the vehicle 102 may also be overlaid with one or more user interface warning notifications that pertain to the detected rear seat passengers/objects. The BCM 104 may additionally present the dismiss user interface input button to provide an option to dismiss the user interface warning notifications and cease presentation of the rear seat interface on the mobile device(s) 122.

The method 600 may proceed to block 626, wherein the method 600 may include determining if the dismiss user interface input is received on the mobile device(s) 122. As discussed above, the rear seat interface may be presented with the dismiss user interface input on the mobile device(s) 122. The dismiss user interface input may be inputted to allow the driver to dismiss the user interface notification warning(s) presented via the rear seat interface on the display screen 124 of the mobile device(s) 122. In one embodiment, upon receiving an input on the dismiss user interface input, the mobile device(s) 122 may utilize the communication device 128 to communicate respective data associated with the received input to the BCM 104 via the communication unit 120. If the input is not received on the dismiss user interface input, the mobile device(s) 122 may not communicate respective data associated with the received input to the BCM 104. In an exemplary embodiment, the BCM 104 may determine that the dismiss user interface input is inputted by the on the mobile device(s) 122 based on the receipt of the respective data associated with the input from the mobile device(s) 122. Alternatively, the BCM 104 may determine that the dismiss user interface input is not inputted when respective data associated with the input from the mobile device(s) 122 is not received by the BCM 104.

If it is determined that the dismiss user interface input is not received on the mobile device(s) 122 (at block 626), the method 600 may proceed to block 628, wherein the method 600 may include providing an audio/vibratory alert on the mobile device(s) 122 for a predetermined number of times at predetermined durations. In an exemplary embodiment, the BCM 104 may communicate data to the RSM application executed on the mobile device(s) 122 based on communication between the communication unit 120 and the communication device 128. The data may include one or more commands to initiate the audio alert via speaker(s) of the mobile device(s) 122 and/or a vibratory alert via the vibration motor of the mobile device(s) 122.

In some embodiments, the RSM application may communicate with the processor 126 of the mobile device(s) 122 to provide the audio/vibratory alert for a predetermined number of times at predetermined durations (e.g., 5 times for 10 seconds each) until the BCM 104 determines that the dismiss user interface input is received on the rear seat interface of the mobile device(s) 122. In an additional embodiment, the RSM application may communicate with the processor 126 of the mobile device(s) 122 to provide the audio/vibratory alert for a predetermined number of times at predetermined durations until the BCM 104 determines that one or more rear doors of the vehicle 102 are opened. In an alternate embodiment, the audio/vibratory alert may cease to be provided after a predetermined amount of time if the input of the dismiss user interface input is not received.

If it determined that the portable device(s) 130 is inputted to dismiss the audio and/or lighting notification (at block 614 or block 620), or that the dismiss user interface input is received on the mobile device(s) 122 (at block 626), the method 600 may proceed to block 630. Alternatively, upon providing the audio/vibratory alert on the mobile device(s) (at block 628), the method may proceed to block 630. At block 630, the method 600 may include deactivating the RSM system 100. In an exemplary embodiment, the BCM 104 may deactivate the RSM system 100 and thereby deactivate the sending of data to the RSM system 100 from the vehicle camera system 112 and the vehicle microphone sensors 114. Therefore, the vehicle camera system 112 may no longer capture images/video and the vehicle microphone sensors 114 may no longer capture audio to be analyzed by the BCM 104 to provide functionality associated with the RSM system 100.

Figure 7:
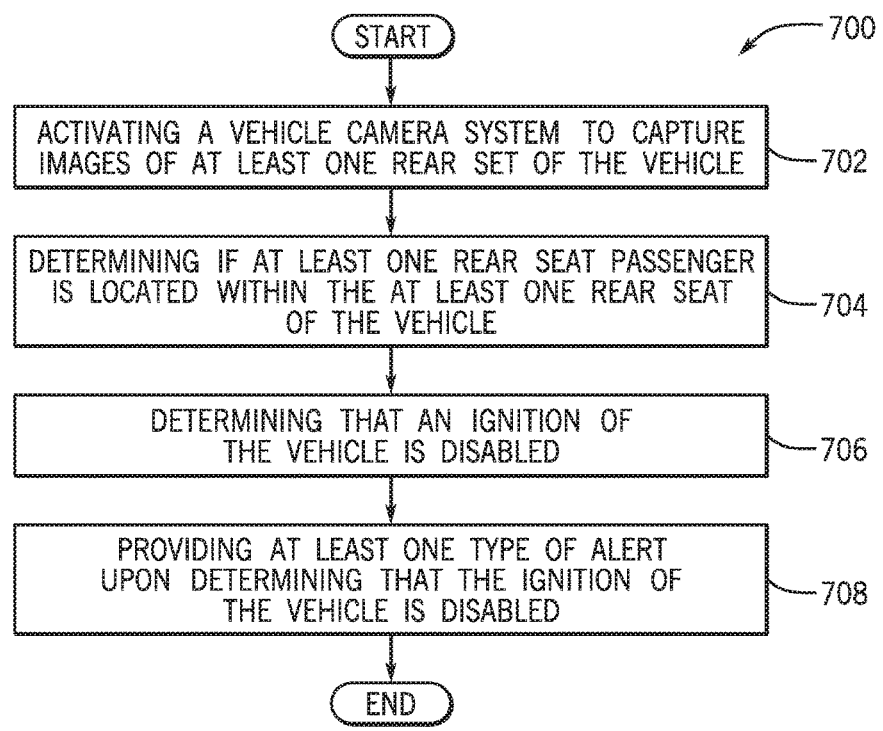
FIG. 7 is an illustrative process flow diagram of a method for alerting a presence of at least one rear seat passenger according to an exemplary embodiment of the present disclosure.

FIG. 7 is an illustrative process flow diagram of a method 700 for alerting a presence of at least one rear seat passenger according to an exemplary embodiment of the present disclosure. The method 700 of FIG. 7 will be described with reference to the components of FIG. 1 and FIG. 2, though it is to be appreciated that the method 7600 of FIG. 6 may be used with other systems and/or components. The method 700 may begin at block 702, wherein the method 700 may include activating a vehicle camera system 112 to capture images of at least one rear seat of the vehicle 102.

The method 700 may proceed to block 704, wherein the method 700 may include determining if at least one rear seat passenger is located within the at least one rear seat of the vehicle 102. In one embodiment, image data associated with the images of the at least one rear seat of the vehicle 102 is analyzed to determine if the at least one rear seat passenger is located within the at least one rear seat.

The method 700 may proceed to block 706, wherein the method 700 may include determining that an ignition of the vehicle 102 is disabled. The method 700 may proceed to block 708, wherein the method 700 may include providing at least one type of alert upon determining that the ignition of the vehicle is disabled. In one embodiment, the at least one type of alert is based on if the at least one rear seat passenger is determined to be located within the at least one rear seat of the vehicle.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing rear seat monitoring within a vehicle, comprising:
    activating a vehicle camera system to capture images of at least one rear seat of the vehicle;
    determining if at least one rear seat passenger is located within the at least one rear seat of the vehicle, wherein image data associated with the images of the at least one rear seat of the vehicle is analyzed to determine if the at least one rear seat passenger is located within the at least one rear seat;
    determining that an ignition of the vehicle is disabled; and
    providing at least one type of alert upon determining that the ignition of the vehicle is disabled, wherein the at least one type of alert is based on if the at least one rear seat passenger is determined to be located within the at least one rear seat of the vehicle, wherein the at least one type of alert is based on if the at least one rear seat passenger is not determined to be located within the at least one rear seat of the vehicle.

2. The computer-implemented method of claim 1, wherein activating the vehicle camera system to capture images occurs when at least one rear door of the vehicle is determined to be opened and closed before the ignition of the vehicle is enabled.

3. The computer-implemented method of claim 1, further including activating vehicle microphone sensors to capture audio within a rear portion of the vehicle that includes the at least one rear seat of the vehicle.

4. The computer-implemented method of claim 3, wherein determining if the at least one rear seat passenger is located within the at least one rear seat includes receiving audio data from the vehicle microphone sensors and analyzing a pitch and frequency of captured audio against at least one predetermined pitch threshold and at least one frequency threshold to determine if the at least one rear seat passenger is located within the at least one rear seat, wherein a location of the at least one rear seat passenger is determined from the audio data when the at least one rear seat passenger is determined to be located within the at least one rear seat.

5. The computer-implemented method of claim 1, further including storing a detection indication flag when the at least one rear seat passenger is determined to be located within the at least one rear seat of the vehicle, wherein the detection indication flag includes a location of the at least one rear seat passenger.

6. The computer-implemented method of claim 5, wherein providing the at least one type of alert includes analyzing the detection indication flag and providing a user interface that includes a video feed of the at least one rear seat of the vehicle, wherein the video feed is presented with at least one rear seat of the vehicle as highlighted over at least one location where the at least one passenger is determined to be located.

7. The computer-implemented method of claim 6, wherein the user interface also includes a user interface notification warning, an audio warning, and a dismiss user interface input that dismisses the user interface notification upon input.

8. The computer-implemented method of claim 1, further including storing a non-detection indication flag when the at least one rear seat passenger is not determined to be located within the at least one rear seat of the vehicle.

9. The computer-implemented method of claim 8, wherein providing the at least one type of alert includes analyzing the non-detection indication flag and providing a user interface that includes a video feed of the at least one rear seat of the vehicle, a user interface notification warning, and a dismiss user interface input that dismisses the user interface notification upon input.

10. A system for providing rear seat monitoring within a vehicle, comprising:
a memory storing instructions when executed by a processor cause the processor to:
activate a vehicle camera system to capture images of at least one rear seat of the vehicle;
determine if at least one rear seat passenger is located within the at least one rear seat of the vehicle, wherein image data associated with the images of the at least one rear seat of the vehicle is analyzed to determine if the at least one rear seat passenger is located within the at least one rear seat;
determine that an ignition of the vehicle is disabled; and
provide at least one type of alert upon determining that the ignition of the vehicle is disabled, wherein the at least one type of alert is based on if the at least one rear seat passenger is determined to be located within the at least one rear seat of the vehicle, wherein the at least one type of alert is based on if the at least one rear seat passenger is not determined to be located within the at least one rear seat of the vehicle.

11. The system of claim 10, wherein activating the vehicle camera system to capture images occurs when at least one rear door of the vehicle is determined to be opened and closed before the ignition of the vehicle is enabled.

12. The system of claim 10, further including activating vehicle microphone sensors to capture audio within a rear portion of the vehicle that includes the at least one rear seat of the vehicle.

13. The system of claim 12, wherein determining if the at least one rear seat passenger is located within the at least one rear seat includes receiving audio data from the vehicle microphone sensors and analyzing a pitch and frequency of captured audio against at least one predetermined pitch threshold and at least one frequency threshold to determine if the at least one rear seat passenger is located within the at least one rear seat, wherein a location of the at least one rear seat passenger is determined from the audio data when the at least one rear seat passenger is determined to be located within the at least one rear seat.

14. The system of claim 10, further including storing a detection indication flag when the at least one rear seat passenger is determined to be located within the at least one rear seat of the vehicle, wherein the detection indication flag includes a location of the at least one rear seat passenger.

15. The system of claim 14, wherein providing the at least one type of alert includes analyzing the detection indication flag and providing a user interface that includes a video feed of the at least one rear seat of the vehicle, wherein the video feed is presented with at least one rear seat of the vehicle as highlighted over at least one location where the at least one passenger is determined to be located.

16. The system of claim 15, wherein the user interface also includes a user interface notification warning, an audio warning, and a dismiss user interface input that dismisses the user interface notification upon input.

17. The system of claim 10, further including storing a non-detection indication flag when the at least one rear seat passenger is not determined to be located within the at least one rear seat of the vehicle.

18. The system of claim 17, wherein providing the at least one type of alert includes analyzing the non-detection indication flag and providing a user interface that includes a video feed of the at least one rear seat of the vehicle, a user interface notification warning, and a dismiss user interface input that dismisses the user interface notification upon input.

19. A non-transitory computer readable storage medium storing instructions that when executed by a computer, which includes a processor perform a method, the method comprising:
activating a vehicle camera system to capture images of at least one rear seat of the vehicle;
determining if at least one rear seat passenger is located within the at least one rear seat of the vehicle, wherein image data associated with the images of the at least one rear seat of the vehicle is analyzed to determine if the at least one rear seat passenger is located within the at least one rear seat;

determining that an ignition of the vehicle is disabled; and providing at least one type of alert upon determining that the ignition of the vehicle is disabled, wherein the at least one type of alert is based on if the at least one rear seat passenger is determined to be located within the at least one rear seat of the vehicle, wherein the at least one type of alert is based on if the at least one rear seat passenger is not determined to be located within the at least one rear seat of the vehicle.

20. The non-transitory computer readable storage medium of claim 19, further including activating vehicle microphone sensors to capture audio within a rear portion of the vehicle that includes the at least one rear seat of the vehicle.

\* \* \* \* \*